(12) United States Patent
Ivanov et al.

(10) Patent No.: US 9,823,357 B2
(45) Date of Patent: Nov. 21, 2017

(54) WIRELESS RECEIVER BEING CAPABLE OF DETERMINING ITS VELOCITY

(71) Applicant: Huawei Technologies Co., Ltd., Shenzhen, Guangdong (CN)

(72) Inventors: Vladimir Iosifovich Ivanov, Moscow (RU); Yanxing Zeng, Hangzhou (CN); Jianqiang Shen, Hangzhou (CN); Lev Borisovich Rapoport, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/133,937

(22) Filed: Apr. 20, 2016

(65) Prior Publication Data

US 2016/0231433 A1 Aug. 11, 2016

Related U.S. Application Data

(63) Continuation of application No. PCT/RU2013/000926, filed on Oct. 21, 2013.

(51) Int. Cl.
*G01S 19/52* (2010.01)
*G01S 19/44* (2010.01)
(Continued)

(52) U.S. Cl.
CPC ............. *G01S 19/52* (2013.01); *G01S 11/10* (2013.01); *G01S 19/13* (2013.01); *G01S 19/44* (2013.01)

(58) Field of Classification Search
CPC ..................................................... G01S 11/10
(Continued)

(56) References Cited

U.S. PATENT DOCUMENTS

| 6,175,806 B1 | 1/2001 | Thuente |
| 2009/0066574 A1* | 3/2009 | De Lorenzo ............ G01S 19/21 342/357.59 |

(Continued)

FOREIGN PATENT DOCUMENTS

| CN | 1425226 A | 6/2003 |
| CN | 104199057 A | 12/2014 |

OTHER PUBLICATIONS

"Examples of single frequency Cycle-Slip Detectors", Navipedia, Mar. 22, 2013, 5 pages.

(Continued)

*Primary Examiner* — Tashiana Adams
*Assistant Examiner* — Helena Seraydaryan

(57) ABSTRACT

A wireless receiver being capable of determining its velocity with respect to a number of wireless transmitters is provided. The wireless receiver includes a communication interface for receiving a number of carrier signals originating from the number of wireless transmitters, and a processor being configured to determine a number of carrier phases of the carrier signals at two different time instants, to determine a number of carrier phase differences from the determined number of carrier phases for each carrier signal between the two different time instants, to determine a location matrix indicating a geometric relationship between a location of the wireless receiver and a number of locations of the number of transmitters, and to determine the velocity of the wireless receiver upon the basis of the number of carrier phase differences and the location matrix.

18 Claims, 7 Drawing Sheets

(51) Int. Cl.
*G01S 11/10* (2006.01)
*G01S 19/13* (2010.01)
(58) Field of Classification Search
USPC .................................................. 342/357.27
See application file for complete search history.

(56) References Cited

U.S. PATENT DOCUMENTS

2012/0127029 A1* 5/2012 Rachlin .................. G01S 19/40
342/357.23
2012/0212369 A1* 8/2012 Revol ...................... G01P 1/16
342/357.35

OTHER PUBLICATIONS

Zhoufeng Ren et al., "A Real-time Cycle-slip Detection and Repair Method for Single Frequency GPS Receiver", 2011 2nd International Conference on Networking and Information Technology, vol. 17, 2011, p. 224-230.

Emmanuel J. Candes et al., "Decoding by Linear Programming", IEEE Transactions on Information Theory, vol. 51, No. 12, Dec. 2005, p. 4203-4215.

Emmanuel J. Candes et al., "Robust Uncertainty Principles: Exact Signal Reconstruction From Highly Incomplete Frequency Information", IEEE Transactions on Information Theory, vol. 52, No. 2, Feb. 2006, p. 489-509.

David L. Donoho, "Compressed Sensing", IEEE Transactions on Information Theory, vol. 52, No. 4, Apr. 2006, p. 1289-1306.

David L. Donoho et al., "Sparse Solution of Underdetermined Systems of Linear Equations by Stagewise Orthogonal Matching Pursuit", IEEE Transactions on Information Theory, vol. 58, No. 2, Feb. 2012, p. 1094-1121.

Gene H. Golub et al., Matrix Computations, 3rd edition, 1996, 723 pages.

T. Tony Cai et al., "Orthogonal Matching Pursuit for Sparse Signal Recovery With Noise", IEEE Transactions on Information Theory, vol. 57, No. 7, Jul. 2011, p. 4680-4688.

Joel A. Tropp, "Greed is Good: Algorithmic Results for Sparse Approximation", IEEE Transactions on Information Theory, vol. 50, No. 10, Oct. 2004, p. 2231-2242.

M. Salman Asif et al. "Basis Pursuit with Sequential Measurements and Time Varying Signals", 2009 3rd IEEE International Workshop on Computational Advances in Multi-Sensor Adaptive Processing, 2009, p. 293-296.

Honglin Huang et al., "Backtracking-Based Matching Pursuit Method for Sparse Signal Reconstruction", IEEE Signal Processing Letters, vol. 18, No. 7, Jul. 2011, p. 391-394.

Arthur Gelb, "Applied Optimal Estimation", by The Analytic Sciences Corporation, The MIT Press, May 1974, 1 page.

Alexander Schrijver, "Theory of Linear and Integer Programming", 1986, 481 pages.

Schnelle et al., "A Compressive Phase-Locked Loop", Mitsubishi Electric Research Laboratories, Mar. 2012, 6 pages.

* cited by examiner

WIRELESS RECEIVER BEING CAPABLE OF DETERMINING ITS VELOCITY

CROSS-REFERENCE TO RELATED APPLICATIONS

This application is a continuation of International Application No. PCT/RU2013/000926, filed on Oct. 21, 2013, which is hereby incorporated by reference in its entirety.

TECHNICAL FIELD

The present patent application relates to the field of wireless velocity determination.

BACKGROUND

Wireless velocity determination systems can be based on determining a number of carrier phases of a number of carrier signals. For velocity determination of a wireless receiver, the number of carrier signals can e.g. be transmitted by a number of wireless transmitters and can be received by the wireless receiver in order to determine its velocity.

For determining the number of carrier phases, the wireless receiver usually comprises a number of phase locked loops. Disturbances in the operation of a phase locked loop, e.g. caused by short term shading or mechanical shock, can result in a cycle slip of the phase locked loop and impede the determination of the velocity of the wireless receiver.

Common methods for detection of cycle slips in phase locked loops are usually highly dependent on the expected dynamics of the wireless receiver. Aggressive dynamics can cause a carrier phase variation mistakenly identified as a cycle slip causing a false alarm of a cycle slip detector. Common methods based on a simultaneous analysis of the whole number of phase locked loops usually have either low probability of correct detection or high computational cost.

In Zhoufeng Ren, et al., "A Real-time Cycle-slip Detection and Repair Method for Single Frequency GPS Receiver", 2011, 2nd Int. Conf. on Networking and Inf. Technol. IPCSIT, vol. 17, pp. 224-230, cycle slips are analyzed separately in each phase locked loop.

SUMMARY

It is the object of the patent application to provide a wireless receiver being capable of determining its velocity with improved cycle slip robustness.

This object is achieved by the features of the independent claims. Further implementation forms are apparent from the dependent claims, the description and the figures.

The patent application is based on the finding that a compressive sensing based approach for detection and/or correction of a cycle slip in carrier phase determination can be applied.

According to a first aspect, the patent application relates to a wireless receiver being capable of determining its velocity with respect to a number of wireless transmitters, the wireless receiver comprising a communication interface for receiving a number of carrier signals originating from the number of wireless transmitters, and a processor being configured to determine a number of carrier phases of the carrier signals at two different time instants, to determine a number of carrier phase differences from the determined number of carrier phases for each carrier signal between the two different time instants, to determine a location matrix indicating a geometric relationship between a location of the wireless receiver and a number of locations of the number of transmitters, and to determine the velocity of the wireless receiver upon the basis of the number of carrier phase differences and the location matrix. Thus, a wireless receiver being capable of determining its velocity with improved cycle slip robustness can be provided.

The wireless receiver and the wireless transmitters can be part of a global navigation satellite system (GNSS), e.g. a GPS navigation satellite system, a GLONASS navigation satellite system, or a Galileo navigation satellite system.

The communication interface can be configured to convert the number of carrier signals from radio frequency domain into baseband domain. The communication interface can comprise an analog-to-digital-converter, a filter, an amplifier, and/or an antenna for receiving the number of carrier signals.

The processor can be configured to execute a computer program.

The velocity of the wireless receiver can comprise a velocity value, e.g. 5 m/s, and/or a velocity direction, e.g. 45°. The velocity of the wireless receiver can be represented by a vector.

The carrier signals can be characterized by a corresponding carrier frequency, e.g. 1.5 GHz or 1.6 GHz, and a corresponding carrier phase, e.g. 20° or 65°. The carrier signals can be modulated.

The carrier phases can be characterized by a corresponding phase angle, e.g. 25° or 55°. The carrier phases can further be characterized by a corresponding fraction relative to the corresponding wavelength, e.g. a tenth or a third of the wavelength.

The carrier phase differences can be characterized by a corresponding phase difference angle, e.g. 1° or 5°. The carrier phase differences can further be characterized by a corresponding fraction relative to the corresponding wavelength, e.g. a twelfth or a fifth of the wavelength.

The two different time instants can be characterized by a difference in time, e.g. 5 µs. The difference in time between the two different time instants can relate to a sampling time interval.

The location matrix can indicate a geometric relationship between the location of the wireless receiver and the number of locations of the number of transmitters. The location matrix can be a directional cosine matrix.

The geometric relationship between the location of the wireless receiver and the number of locations of the number of transmitters can relate to the mutual distance and/or mutual angle between the location of the wireless receiver and the number of locations of the number of transmitters.

The location of the wireless receiver and the number of locations of the number of transmitters can be characterized by a corresponding coordinate in a coordinate system, e.g. a Cartesian (x, y, z) coordinate system.

In a first implementation form according to the first aspect as such, the processor is configured to determine the velocity of the wireless receiver upon the basis of an optimization procedure according to the following equations:

$$\delta\varphi^k - HY^k + d^{(k)} = 0$$

$$|d^{(k)}|_1 \to \min_{Y^k \in R^4, d^k \in R^n}$$

wherein $\delta\varphi^k$ denotes a vector comprising the number of carrier phase differences, H denotes the location matrix, $Y^k$ denotes a vector comprising the velocity of the wireless receiver, $d^{(k)}$ denotes a vector comprising a number of cycle slip values, $|\ |_1$ denotes the $l_1$-norm of a vector, k denotes a time instant index, $R^4$ denotes the 4-dimensional set of real numbers, $R^n$ denotes the n-dimensional set of real numbers and n denotes the number of wireless transmitters. Thus, the velocity of the wireless receiver can be determined efficiently.

The cycle slip values can correspond to a missed and/or a skipped cycle of a determined carrier phase. For a full cycle of 360°, a cycle slip value of one can e.g. correspond to a determined carrier phase of 15° instead of 375° or vice versa.

The vector $d^{(k)}$ can be supposed to be sparse, i.e. the number of zero entries can be supposed to be substantially larger than the number of non-zero entries.

In a second implementation form according to the first aspect as such or the first implementation form of the first aspect, the processor is configured to determine the velocity of the wireless receiver upon the basis of an optimization procedure according to the following equations:

$$\delta\varphi^k - HY^k + d^{(k)} = 0$$
$$|d^{(k)}|_1 \to \min_{Y^k \in R^4, d^k \in Z^n}$$

wherein $\delta\varphi^k$ denotes a vector comprising the number of carrier phase differences, H denotes the location matrix, $Y^k$ denotes a vector comprising the velocity of the wireless receiver, $d^{(k)}$ denotes a vector comprising a number of cycle slip values, $|\ |_1$ denotes the $l_1$-norm of a vector, k denotes a time instant index, $R^4$ denotes the 4-dimensional set of real numbers, $Z^n$ denotes the n-dimensional integer lattice and n denotes the number of wireless transmitters. Thus, the velocity of the wireless receiver can be determined efficiently.

The cycle slip values can correspond to a missed and/or a skipped cycle of a determined carrier phase. For a full cycle of 360°, a cycle slip value of one can e.g. correspond to a determined carrier phase of 15° instead of 375° or vice versa.

The vector $d^{(k)}$ can be supposed to be sparse, i.e. the number of zero entries can be supposed to be substantially larger than the number of non-zero entries.

In a third implementation form according to the first aspect as such, the first implementation form of the first aspect or the second implementation form of the first aspect, the processor is configured to determine the velocity of the wireless receiver upon the basis of an optimization procedure according to the following equations:

$$\delta\varphi^k - HY^k + d^{(k)} = 0$$
$$|d^{(k)}|_p \to \min_{Y^k \in R^4, d^k \in R^n}$$

wherein $\delta\varphi^k$ denotes a vector comprising the number of carrier phase differences, H denotes the location matrix, $Y^k$ denotes a vector comprising the velocity of the wireless receiver, $d^{(k)}$ denotes a vector comprising a number of cycle slip values, $|\ |_p$ denotes the $l_p$-norm of a vector, k denotes a time instant index, $R^4$ denotes the 4-dimensional set of real numbers, $R^n$ denotes the n-dimensional set of real numbers and n denotes the number of wireless transmitters. Thus, the velocity of the wireless receiver can be determined efficiently.

The cycle slip values can correspond to a missed and/or a skipped cycle of a determined carrier phase. For a full cycle of 360°, a cycle slip value of one can e.g. correspond to a determined carrier phase of 15° instead of 375° or vice versa.

The vector $d^{(k)}$ can be supposed to be sparse, i.e. the number of zero entries can be supposed to be substantially larger than the number of non-zero entries.

In a fourth implementation form according to the first implementation form of the first aspect, the second implementation form of the first aspect or the third implementation form of the first aspect, the processor is configured to perform the optimization procedure using a linear programming method, a semi-integer linear programming method or an orthogonal matching pursuit method. Thus, the optimization procedure can be performed using efficient optimization methods.

The linear programming method can be adapted to optimize a linear objective function, subject to linear equality constraints and/or linear inequality constraints. The linear programming method can comprise a simplex method, and/or an interior point method.

The semi-integer linear programming method can be adapted to optimize a linear objective function, subject to linear equality constraints and/or linear inequality constraints, wherein a number of variables can be supposed to be integers.

The orthogonal matching pursuit method can be adapted to optimize a linear objective function, subject to linear equality constraints and/or linear inequality constraints. The orthogonal matching pursuit method can comprise a QR factorization or a QR decomposition of the location matrix.

The orthogonal matching pursuit method can further comprise an integer search method, such as a zero-forcing (ZF) method, a minimum-mean-square-error (MMSE) method, a maximum-likelihood-decoding (MLD) method, and/or a spherical maximum-likelihood-decoding (MLD) method, at its last iteration.

In a fifth implementation form according to the first aspect as such or any preceding implementation form of the first aspect, the processor is configured to determine the number of carrier phases of the carrier signals by comparing the number of carrier signals with a number of reference signals. Thus, the carrier phases can be determined independently for each carrier signal.

The reference signals can be characterized by a corresponding reference frequency, e.g. 1.5 GHz or 1.6 GHz, and a corresponding reference phase, e.g. 0°. The reference signals can be modulated.

Comparing a carrier signal with a reference signal can comprise determining a phase shift between the carrier signal and the reference signal. The phase shift between the carrier signal and the reference signal can be determined e.g. by a phase detector.

In a sixth implementation form according to the first aspect as such or any preceding implementation form of the first aspect, the communication interface comprises a number of phase-locked-loops for receiving the number of carrier signals originating from the number of wireless transmitters. Thus, the carrier signals can be received in a carrier phase preserving manner.

The phase-locked-loops can comprise a variable frequency oscillator and/or a phase detector. The phase-locked-loops can further comprise a feedback loop.

In a seventh implementation form according to the first aspect as such or any preceding implementation form of the first aspect, the communication interface is configured to receive the number of carrier signals according to a frequency-division-multiple-access scheme, time-division-multiple-access scheme or a code-division-multiple-access scheme. Thus, mutual interference of the carrier signals can be avoided.

The frequency-division-multiple-access scheme can be characterized by allocating different carrier frequencies to the carrier signals originating from the wireless transmitters. The frequency-division-multiple-access scheme can allow a simultaneous transmission of the carrier signals in time.

The time-division-multiple-access scheme can be characterized by allocating different time slots to the carrier signals originating from the wireless transmitters. The time-division-multiple-access scheme can allow allocating the same carrier frequency to the carrier signals.

The code-division-multiple-access scheme can be characterized by allocating the same carrier frequency to the carrier signals originating from the wireless transmitters while allowing a simultaneous transmission of the carrier signals in time by using a spread spectrum technique.

In an eighth implementation form according to the first aspect as such or any preceding implementation form of the first aspect, the communication interface is configured to selectively receive a number of carrier signals having different carrier frequencies, carrier phase differences, or carrier phase Doppler frequencies. Thus, the carrier signals can be received and processed separately.

The selective reception of the carrier signals can comprise a selective frequency filtering and/or a selective time gating of the carrier signals.

The carrier phase Doppler frequencies can relate to a Doppler shift of the carrier frequencies due to a velocity of the wireless receiver with respect to the number of wireless transmitters.

According to a second aspect, the patent application relates to a method for determining a velocity of a wireless receiver with respect to a number of wireless transmitters, the method comprising receiving a number of carrier signals originating from the number of wireless transmitters by the wireless receiver, determining a number of carrier phases of the carrier signals at two different time instants by the wireless receiver, determining a number of carrier phase differences from the determined number of carrier phases for each carrier signal between the two different time instants by the wireless receiver, determining a location matrix indicating a geometric relationship between a location of the wireless receiver and a number of locations of the number of transmitters, and determining the velocity of the wireless receiver upon the basis of the number of carrier phase differences and the location matrix. Thus, a method for determining a velocity of a wireless receiver with improved cycle slip robustness can be provided.

The wireless receiver and the wireless transmitters can be part of a global navigation satellite system (GNSS), e.g. a GPS navigation satellite system, a GLONASS navigation satellite system, or a Galileo navigation satellite system.

The velocity of the wireless receiver can comprise a velocity value, e.g. 5 m/s, and/or a velocity direction, e.g. 45°. The velocity of the wireless receiver can be represented by a vector.

The carrier signals can be characterized by a corresponding carrier frequency, e.g. 1.5 GHz or 1.6 GHz, and a corresponding carrier phase, e.g. 20° or 65°. The carrier signals can be modulated.

The carrier phases can be characterized by a corresponding phase angle, e.g. 25° or 55°. The carrier phases can further be characterized by a corresponding fraction relative to the corresponding wavelength, e.g. a tenth or a third of the wavelength.

The carrier phase differences can be characterized by a corresponding phase difference angle, e.g. 1° or 5°. The carrier phase differences can further be characterized by a corresponding fraction relative to the corresponding wavelength, e.g. a twelfth or a fifth of the wavelength.

The two different time instants can be characterized by a difference in time, e.g. 5 µs. The difference in time between the two different time instants can relate to a sampling time interval.

The location matrix can indicate a geometric relationship between the location of the wireless receiver and the number of locations of the number of transmitters. The location matrix can be a directional cosine matrix.

The geometric relationship between the location of the wireless receiver and the number of locations of the number of transmitters can relate to the mutual distance and/or mutual angle between the location of the wireless receiver and the number of locations of the number of transmitters.

The location of the wireless receiver and the number of locations of the number of transmitters can be characterized by a corresponding coordinate in a coordinate system, e.g. a Cartesian (x, y, z) coordinate system.

The method for determining the velocity of the wireless receiver can be performed by the wireless receiver according to the first aspect as such or any implementation form of the first aspect.

Further features of the method for determining the velocity of the wireless receiver can result from the functionality of the wireless receiver according to the first aspect as such or any implementation form of the first aspect.

In a first implementation form according to the second aspect as such, determining the velocity of the wireless receiver is performed upon the basis of an optimization procedure according to the following equations:

$$\delta\varphi^k - HY^k + d^{(k)} = 0$$

$$|d^{(k)}|_1 \to \min_{Y^k \in R^4, d^k \in R^n}$$

wherein $\delta\phi^k$ denotes a vector comprising the number of carrier phase differences, H denotes the location matrix, $Y^k$ denotes a vector comprising the velocity of the wireless receiver, $d^{(k)}$ denotes a vector comprising a number of cycle slip values, $|\ |_1$ denotes the $l_1$-norm of a vector, k denotes a time instant index, $R^4$ denotes the 4-dimensional set of real numbers, $R^n$ denotes the n-dimensional set of real numbers and n denotes the number of wireless transmitters. Thus, the velocity of the wireless receiver can be determined efficiently.

The cycle slip values can correspond to a missed and/or a skipped cycle of a determined carrier phase. For a full cycle of 360°, a cycle slip value of one can e.g. correspond to a determined carrier phase of 15° instead of 375° or vice versa.

The vector $d^{(k)}$ can be supposed to be sparse, i.e. the number of zero entries can be supposed to be substantially larger than the number of non-zero entries.

In a second implementation form according to the second aspect as such or the first implementation form of the second aspect, determining the velocity of the wireless receiver is performed upon the basis of an optimization procedure according to the following equations:

$$\delta\varphi^k - HY^k + d^{(k)} = 0$$
$$|d^{(k)}|_1 \rightarrow \min_{Y^k \in R^4, d^k \in Z^n}$$

wherein $\delta\varphi^k$ denotes a vector comprising the number of carrier phase differences, H denotes the location matrix, $Y^k$ denotes a vector comprising the velocity of the wireless receiver, $d^{(k)}$ denotes a vector comprising a number of cycle slip values, $|\ |_1$ denotes the $l_1$-norm of a vector, k denotes a time instant index, $R^4$ denotes the 4-dimensional set of real numbers, $Z^n$ denotes the n-dimensional integer lattice and n denotes the number of wireless transmitters. Thus, the velocity of the wireless receiver can be determined efficiently.

The cycle slip values can correspond to a missed and/or a skipped cycle of a determined carrier phase. For a full cycle of 360°, a cycle slip value of one can e.g. correspond to a determined carrier phase of 15° instead of 375° or vice versa.

The vector $d^{(k)}$ can be supposed to be sparse, i.e. the number of zero entries can be supposed to be substantially larger than the number of non-zero entries.

In a third implementation form according to the second aspect as such, the first implementation form of the second aspect or the second implementation form of the second aspect, determining the velocity of the wireless receiver is performed upon the basis of an optimization procedure according to the following equations:

$$\delta\varphi^k - HY^k + d^{(k)} = 0$$
$$|d^{(k)}|_p \rightarrow \min_{Y^k \in R^4, d^k \in R^n}$$

wherein $\delta\varphi^k$ denotes a vector comprising the number of carrier phase differences, H denotes the location matrix, $Y^k$ denotes a vector comprising the velocity of the wireless receiver, $d^{(k)}$ denotes a vector comprising a number of cycle slip values, $|\ |_p$ denotes the $l_p$-norm of a vector, k denotes a time instant index, $R^4$ denotes the 4-dimensional set of real numbers, $R^n$ denotes the n-dimensional set of real numbers and n denotes the number of wireless transmitters. Thus, the velocity of the wireless receiver can be determined efficiently.

The cycle slip values can correspond to a missed and/or a skipped cycle of a determined carrier phase. For a full cycle of 360°, a cycle slip value of one can e.g. correspond to a determined carrier phase of 15° instead of 375° or vice versa.

The vector $d^{(k)}$ can be supposed to be sparse, i.e. the number of zero entries can be supposed to be substantially larger than the number of non-zero entries.

In a fourth implementation form according to the first implementation form of the second aspect, the second implementation form of the second aspect or the third implementation form of the second aspect, the optimization procedure is performed using a linear programming method, a semi-integer linear programming method or an orthogonal matching pursuit method. Thus, the optimization procedure can be performed using efficient optimization methods.

The linear programming method can be adapted to optimize a linear objective function, subject to linear equality constraints and/or linear inequality constraints. The linear programming method can comprise a simplex method, and/or an interior point method.

The semi-integer linear programming method can be adapted to optimize a linear objective function, subject to linear equality constraints and/or linear inequality constraints, wherein a number of variables can be supposed to be integers.

The orthogonal matching pursuit method can be adapted to optimize a linear objective function, subject to linear equality constraints and/or linear inequality constraints. The orthogonal matching pursuit method can comprise a QR factorization or a QR decomposition of the location matrix.

The orthogonal matching pursuit method can further comprise an integer search method, such as a zero-forcing (ZF) method, a minimum-mean-square-error (MMSE) method, a maximum-likelihood-decoding (MLD) method, and/or a spherical maximum-likelihood-decoding (MLD) method, at its last iteration.

According to a third aspect, the patent application relates to a computer program for performing the method according to the second aspect as such or any implementation form of the second aspect when executed on a computer. Thus, the method can be applied in an automatic and repeatable manner.

The computer program can be provided in form of a machine-readable code. The computer program can comprise a series of commands for a processor of the computer. The processor of the computer can be configured to execute the computer program.

The computer can comprise a processor, a memory, and/or an input/output means.

The patent application can be implemented in hardware and/or software.

BRIEF DESCRIPTION OF THE DRAWINGS

Further embodiments of the patent application will be described with respect to the following figures, in which.

DETAILED DESCRIPTION

Figure 1:
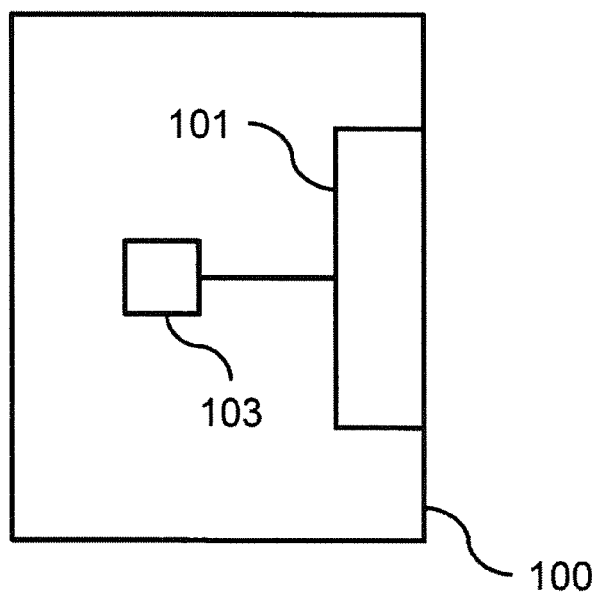
FIG. 1 shows a schematic diagram of a wireless receiver being capable of determining its velocity with respect to a number of wireless transmitters.

FIG. 1 shows a schematic diagram of a wireless receiver 100 being capable of determining its velocity with respect to a number of wireless transmitters. The wireless receiver 100 comprises a communication interface 101 and a processor 103.

The communication interface 101 can be configured to receive a number of carrier signals originating from the number of wireless transmitters. The communication interface 101 can be configured to convert the number of carrier signals from radio frequency domain into baseband domain. The communication interface 101 can comprise an analog-to-digital-converter, a filter, an amplifier, and/or an antenna for receiving the number of carrier signals.

The processor 103 can be configured to determine a number of carrier phases of the carrier signals at two different time instants, to determine a number of carrier phase differences from the determined number of carrier phases for each carrier signal between the two different time instants, to determine a location matrix indicating a geometric relationship between a location of the wireless receiver and a number of locations of the number of transmitters, and to determine the velocity of the wireless receiver upon the basis of the number of carrier phase differences and the location matrix. The processor 103 can be configured to execute a computer program.

The communication interface 101 and the processor 103 can be connected.

The wireless receiver 100 and the wireless transmitters can be part of a global navigation satellite system (GNSS), e.g. a GPS navigation satellite system, a GLONASS navigation satellite system, or a Galileo navigation satellite system.

The velocity of the wireless receiver 100 can comprise a velocity value, e.g. 5 m/s, and/or a velocity direction, e.g. 45°. The velocity of the wireless receiver 100 can be represented by a vector.

The carrier signals can be characterized by a corresponding carrier frequency, e.g. 1.5 GHz or 1.6 GHz, and a corresponding carrier phase, e.g. 20° or 65°. The carrier signals can be modulated.

The carrier phases can be characterized by a corresponding phase angle, e.g. 25° or 55°. The carrier phases can further be characterized by a corresponding fraction relative to the corresponding wavelength, e.g. a tenth or a third of the wavelength.

The carrier phase differences can be characterized by a corresponding phase difference angle, e.g. 1° or 5°. The carrier phase differences can further be characterized by a corresponding fraction relative to the corresponding wavelength, e.g. a twelfth or a fifth of the wavelength.

The two different time instants can be characterized by a difference in time, e.g. 5 μs. The difference in time between the two different time instants can relate to a sampling time interval.

The location matrix can indicate a geometric relationship between the location of the wireless receiver 100 and the number of locations of the number of transmitters. The location matrix can be a directional cosine matrix.

The geometric relationship between the location of the wireless receiver 100 and the number of locations of the number of transmitters can relate to the mutual distance and/or mutual angle between the location of the wireless receiver 100 and the number of locations of the number of transmitters.

The location of the wireless receiver 100 and the number of locations of the number of transmitters can be characterized by a corresponding coordinate in a coordinate system, e.g. a Cartesian (x, y, z) coordinate system.

Figure 2:
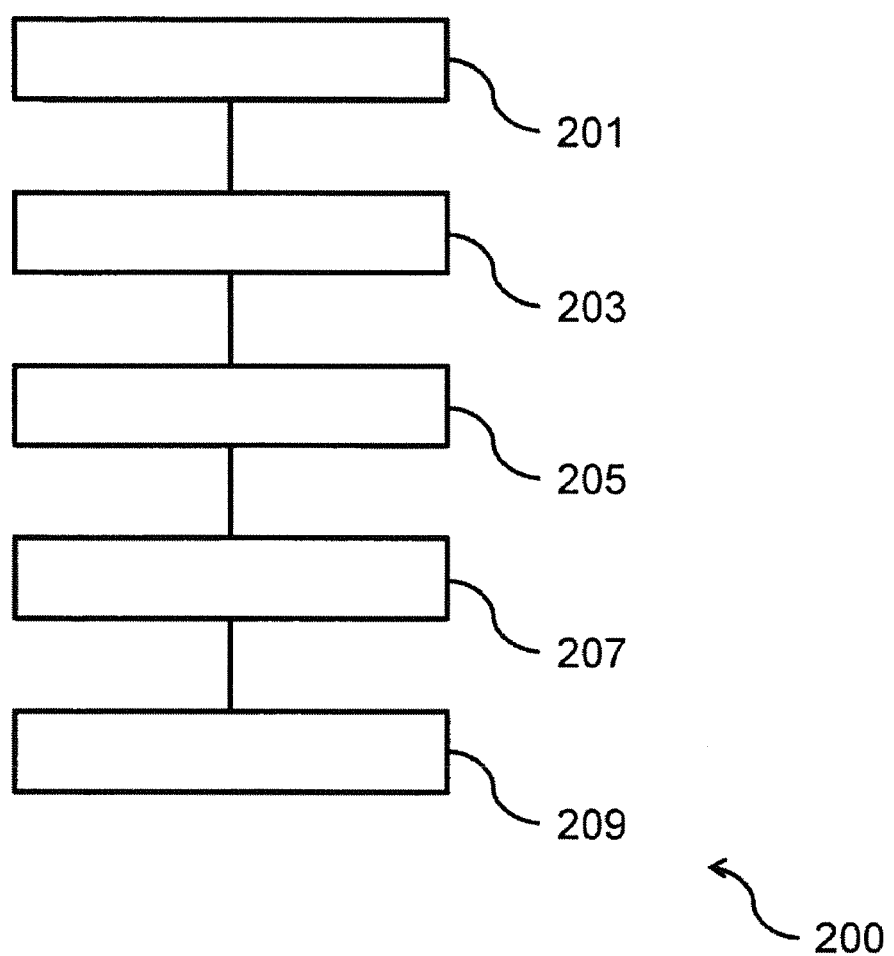
FIG. 2 shows a schematic diagram of a method for determining a velocity of a wireless receiver with respect to a number of wireless transmitters.

FIG. 2 shows a schematic diagram of a method 200 for determining a velocity of a wireless receiver with respect to a number of wireless transmitters.

The method 200 comprises receiving 201 a number of carrier signals originating from the number of wireless transmitters by the wireless receiver, determining 203 a number of carrier phases of the carrier signals at two different time instants by the wireless receiver, determining 205 a number of carrier phase differences from the determined number of carrier phases for each carrier signal between the two different time instants by the wireless receiver, determining 207 a location matrix indicating a geometric relationship between a location of the wireless receiver and a number of locations of the number of transmitters, and determining 209 the velocity of the wireless receiver upon the basis of the number of carrier phase differences and the location matrix.

The method 200 can be performed by a processor of a wireless receiver.

The wireless receiver and the wireless transmitters can be part of a global navigation satellite system (GNSS), e.g. a GPS navigation satellite system, a GLONASS navigation satellite system, or a Galileo navigation satellite system.

The velocity of the wireless receiver can comprise a velocity value, e.g. 5 m/s, and/or a velocity direction, e.g. 45°. The velocity of the wireless receiver can be represented by a vector.

The carrier signals can be characterized by a corresponding carrier frequency, e.g. 1.5 GHz or 1.6 GHz, and a corresponding carrier phase, e.g. 20° or 65°. The carrier signals can be modulated.

The carrier phases can be characterized by a corresponding phase angle, e.g. 25° or 55°. The carrier phases can further be characterized by a corresponding fraction relative to the corresponding wavelength, e.g. a tenth or a third of the wavelength.

The carrier phase differences can be characterized by a corresponding phase difference angle, e.g. 1° or 5°. The carrier phase differences can further be characterized by a corresponding fraction relative to the corresponding wavelength, e.g. a twelfth or a fifth of the wavelength.

The two different time instants can be characterized by a difference in time, e.g. 5 μs. The difference in time between the two different time instants can relate to a sampling time interval.

The location matrix can indicate a geometric relationship between the location of the wireless receiver and the number of locations of the number of transmitters. The location matrix can be a directional cosine matrix.

The geometric relationship between the location of the wireless receiver and the number of locations of the number of transmitters can relate to the mutual distance and/or mutual angle between the location of the wireless receiver and the number of locations of the number of transmitters.

The location of the wireless receiver and the number of locations of the number of transmitters can be characterized by a corresponding coordinate in a coordinate system, e.g. a Cartesian (x, y, z) coordinate system.

Figure 3:
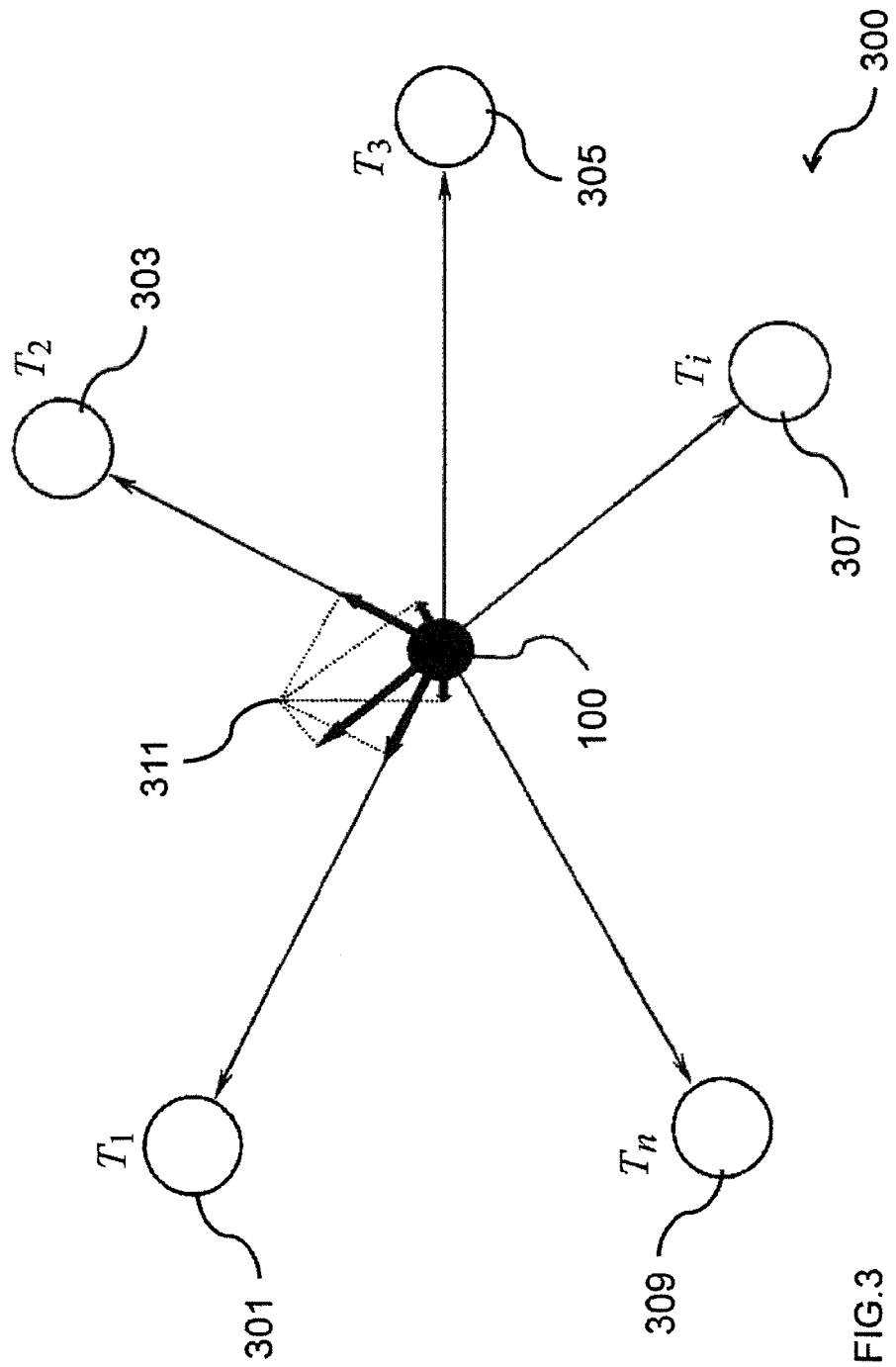
FIG. 3 shows a schematic diagram of a system for velocity determination of a wireless receiver.

FIG. 3 shows a schematic diagram of a system 300 for velocity determination of a wireless receiver 100. The system 300 comprises a wireless receiver 100, a first wireless transmitter 301, a second wireless transmitter 303, a third wireless transmitter 305, an $i^{th}$ wireless transmitter 307, an $n^{th}$ wireless transmitter 309, and a velocity vector v 311. The wireless receiver 100 can comprise an antenna.

The wireless receiver 100 and the wireless transmitters 301, 303, 305, 307, 309 can be located at fixed positions. The small arrows can indicate projections of the velocity vector v 311, shown as a large arrow, onto the line of sight (LOS) lines or vectors.

High precision velocity determination can be based on simultaneous tracking of a plurality of carrier phase Doppler frequencies, or carrier phase incremental in discrete time.

The wireless receiver 100 or mobile receiver can receive radio signals transmitted by several wireless transmitters 301, 303, 305, 307, 309 or transmitters $T_i$, i=1, ..., n. The total number of transmitters can be n.

Each wireless transmitter 301, 303, 305, 307, 309 can emit radio frequency or RF waves at the frequency $f_i$, the wavelength can be $$\lambda_i = \frac{c}{f_i}.$$

The light speed can be c=299792458 m/s. The local clocks of the wireless transmitters 301, 303, 305, 307, 309 can be supposed to be synchronized. Each carrier wave signal received by the wireless receiver 100 can be tracked by its own phase locked loop (PLL). Each PLL can generate a carrier phase measurement $\phi_i^{(k)}$ where k can be the number of sequential time moments, k=1, 2, ... .

The position of the wireless receiver 100 can be known and presented in a fixed coordinate frame by the vector $X=(x,y,z)^T$, the symbol $^T$ can denote the matrix transpose. The wireless transmitters 301, 303, 305, 307, 309 can be located at known positions $X_i=(x_i, y_i, z_i)^T$.

Then the position of the wireless receiver 100 can be connected with the carrier phase of the ith wireless transmitters 301, 303, 305, 307, 309 as:

$$\varphi_i^k = \frac{1}{\lambda_i}\sqrt{(x-x_i)^2 + (y-y_i)^2 + (z-z_i)^2} + N_i + f_i\Delta^k + \varepsilon_i^k,$$

where $\Delta^k$ can be the shift between the local clocks of the receiver and local clocks of the wireless transmitters 301, 303, 305, 307, 309, $N_i$ can be the carrier phase ambiguity which can be an unknown integer value. Its nature can be in the difference between initial phases of the heterodyne of the wireless receiver 100 and the generator of the wireless transmitter 301, 303, 305, 307, 309. Moreover, PLL's tracking carrier phase can be accurate up to an unknown number of cycles. This can explain why ambiguity can take an integer value.

If the real time step $\tau$, i.e. the time incremental between two sequential time instances k+1 and k, is sufficiently small, then the velocity $V^k = (v_x^k, v_y^k, v_z^k)^T$ vector can be connected with the carrier phase measurement incremental as $$\delta\varphi_i^k \equiv \varphi_i^{k+1} - \varphi_i^k \approx \frac{\tau}{\lambda_i} h_i^T Y^k + \delta\varepsilon_i^k \tag{CPI}$$

where $Y^k$ can be a four dimensional vector comprising three entries of the velocity vector extended by a fourth component $\delta\Delta^k = \Delta^{k+1} - \Delta^k$ which can mean the clock rate.

$h_i$ can be the four dimensional vector $$h_i = \begin{pmatrix} \frac{x-x_1}{L_i} \\ \frac{y-y_1}{L_i} \\ \frac{z-z_1}{L_i} \\ 1 \end{pmatrix} - \text{directional cosines vector}$$

with
$L_i = \sqrt{(x-x_i)^2 + (y-y_i)^2 + (z-z_i)^2}$—length of the line of sight (LOS).

The carrier phase incremental equations can be generalized in the measurements equation $$\delta\varphi^k = HY^k + \xi^k \tag{M}$$

where H can be a n×4 matrix, each ith row comprising vectors $$\frac{\tau}{\lambda_i} h_i^T.$$

The equation (M) can be derived in assumption that the ambiguities $N_i$ are constant and do not depend on time k.

Equation (M) can correspond to the case of an absence of cycle slips. A presence of cycle slips in operation of one or several PLLs can suggest the measurement model $$\delta\varphi^k = HY^k + d^{(k)} + \xi^k \tag{MCS}$$

wherein $d^k$ can be a vector of integer valued cycle slips values.

Assuming that CSs can happen to only few of channels, ideally to no channel, the vector $d^k$ can be considered as sparse vector, i.e. zero entries can dominate over non-zero in the sense adopted in the compressive sensing literature. The methods developed in the compressive sensing field can be applied to the recovery of the cycle slips vector. Carrier phase measurements can be considered for analysis.

In the following, the system (MCS) will exemplarily be considered. Considering $d^k$ as an error affecting only few of the linear equations, a linear programming decoding procedure can be applied. In this case, it looks like $$\delta\varphi^k - HY^k + d^{(k)} = 0, \tag{L1}$$
$$|d^{(k)}|_1 \rightarrow \min_{Y^k \in R^4, d^k \in R^n},$$

where $$|z|_1 = \sum_{i=1}^{n} |z_i|$$

can be the $l_1$-norm of the vector. Restricting $d^{(k)}$ to the integer values only, the following problem can be obtained:

$$\delta\varphi^k - HY^k + d^{(k)} = 0, \tag{L1-Integer}$$
$$|d^{(k)}|_1 \rightarrow \min_{Y^k \in R^4, d^k \in R^n},$$

with notation $Z^n$ standing for the integer lattice.

More generally, an $l_p$ optimization problem, i.e.

$$|z|_p = \left(\sum_{i=1}^{n} |z_i|^p\right)^{1/p},$$

can be considered for $0 \leq p \leq 1$:

$$\delta\varphi^k - HY^k + d^{(k)} = 0,$$
$$|d^{(k)}|_p \to \min_{Y^k \in R^4, d^k \in R^n}, \quad (Lp)$$

If p=0 then (Lp) can involve an exhaustive search, as $$|z|_0 = \text{card}\{i : z_i \neq 0\}.$$

If 0<p<1, then the problem (Lp) can be non-convex and can also be NP-hard.

If p=1 then (Lp) can turn to (L1) which can be a real-valued $l_1$ convex linear programming problem. It can be solved by a linear programming procedure, like a simplex method and/or an interior point method.

Restricting $d^{(k)}$ to only integer values, a semi-integer linear program can be obtained which can be solved by integer programming methods.

Alternatively, an orthogonal matching pursuit (OMP) approach can be applied, which can be less accurate in detection of sparse solutions, but can be faster than $l_1$ and therefore, better run in real time. Applying QR factorization to the matrix H $$QH = \begin{bmatrix} L^T \\ 0 \end{bmatrix}, \quad (LQ)$$

where L can be a low triangular 4 by 4 matrix, 0 can stand for a zero matrix of appropriate size, e.g. (n−4)×4 in this case, Q can be a n×n orthogonal housholder matrix. Then presenting it in the block form $$Q = \begin{bmatrix} Z \\ F \end{bmatrix}, Z \in R^{4 \times n}, F \in R^{(n-4) \times 4},$$

the following identity can be obtained $$FH = 0.$$

The last identity can mean that F can be an annihilating matrix for H. Multiplying both sides of the linear system (MCS) by the matrix F and ignoring noise, the following system can be obtained:

$$Fd = b \quad (Resid)$$

where $b = F\delta\varphi^k$, a superscript $^k$ can be ignored for simplicity:

$$d = d^k.$$

Then, the problem (P) to find the sparsest solution of the linear system (Resid) can be obtained. The sparsest solution of (Resid) can mean the solution having the least number of entries in its support set $$S = \{i : d_i \neq 0\}.$$

The resulting support set of least cardinality can be the set of channels affected by cycle slips in the original formulation of the problem.

The problem (P) can be solved by the orthogonal matching pursuit (OMP) algorithm. It can operate like shown below.

Step 0: Initialize the residual $r^{(0)} = b$, and initialize the estimate of the support set $S^{(0)} \neq \emptyset$.

Step l=1, 2, . . . : Find the column $F_{j^{(k)}}$ of the matrix F that solves the problem $$j^{(l)} = \arg\max_j \frac{|F_j^T s^{(l-1)}|}{\|F_j\|},$$

and update $S^{(l)} = S^{(l-1)} \cup \{j^{(l)}\}$, $s^{(l)} = F_{S^{(l)}} x^{(l)} - b$, where $F_{S^{(l)}}$ can be the sub-matrix of F consisting of columns $F_j$ with indices $j \in S^{(l)}$.

The steps can be repeated until stopping criterion is satisfied $$s^{(l)T} s^{(l)} \leq \sigma^2. \quad (SC)$$

That can be a kind of so-called greedy algorithms, the index included into the support set may not be taken out of the set.

Now a connection between an application of the OMP algorithm to the problem (P) and the first isolation procedure (A) can be established. Ignoring the weighting matrix W, because $$H := \tilde{L}^T H, b := \tilde{L}^T b, \text{ where } \tilde{L}\tilde{L}^T = W \text{ can always be set,}$$

$$Y = (H^T H)^{-1} H^T \delta\varphi,$$

$$r = \delta\varphi - (H^T H)^{-1} H^T \delta\varphi,$$

can be obtained, wherein superscripts $^k$ can be ignored for simplicity. Taking into account (LQ) factorization, $$r = \delta\varphi - Q^T \begin{bmatrix} L^T \\ 0 \end{bmatrix} (LL^T)^{-1} [L | 0] Q \delta\varphi =$$

$$= \delta\varphi - Q^T \begin{bmatrix} I & 0 \\ 0 & 0 \end{bmatrix} Q \delta\varphi = Q^T \begin{bmatrix} 0 & 0 \\ 0 & I \end{bmatrix} Q \delta\varphi$$

$$= [Z^T | F^T] \begin{bmatrix} 0 & 0 \\ 0 & I \end{bmatrix} \begin{bmatrix} Z \\ F \end{bmatrix} \delta\varphi = F^T F \delta\varphi$$

$$= F^T b,$$

can be obtained, and taking into account the last identity, i.e. $r = F^T b$, it can be seen that the selection of the index $j^{(l)}$ at the step k for l=1 looks pretty much similar to the selection of the maximum residual entry, i.e. max, in the first isolation procedure. Using more algebra, it can be proved that using OMP for the problem (P) can be practically equivalent, up to some minor details, to the first isolation procedure.

The advantage of this OMP algorithm can be its low computational complexity compared with other methods.

Furthermore, it can be proved, that an application of an exhaustive search $l_0$-optimization, i.e. solving the Lp for p=0 can be equivalent to an application of the second isolation procedure (B).

In addition to an ordinary OMP scheme, the last iteration of OMP can be concluded with any of suitable integer valued least square detectors, such as ZF, MMSE, MLD, or spherical, to obtain integer values of $d^k$.

The solution of the problem (L1) or, which can be equivalent, the solution of the problem $$Fd=b,$$

$$|d|_1 \to \min \qquad (L1')$$

can allow for more efficient isolation of cycle slips than it can be provided by the first isolation procedure, equivalently OMP, and less computationally hard isolation than it can be provided by the second isolation procedure, equivalently $l_0$ optimization.

Figure 4:
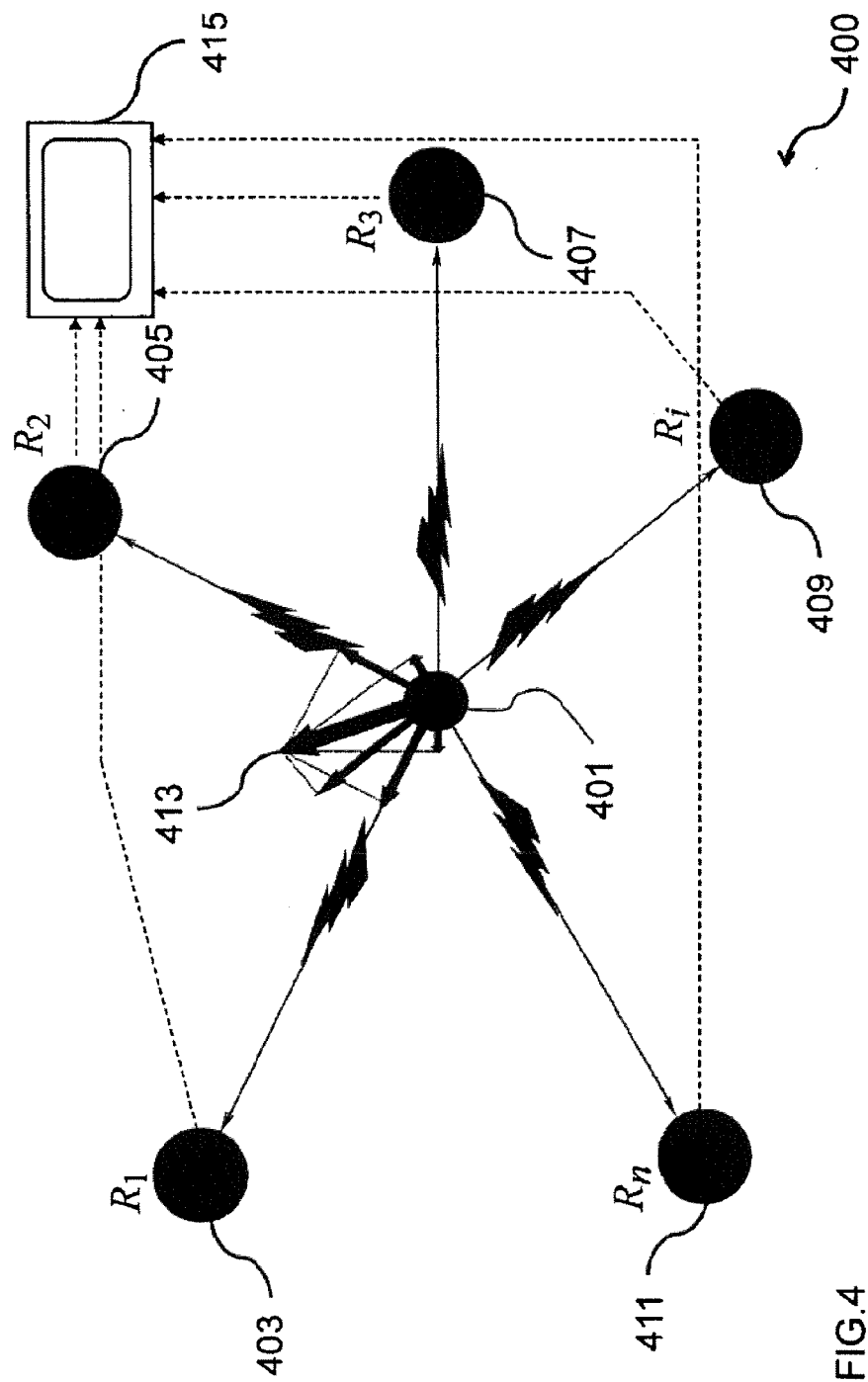
FIG. 4 shows a schematic diagram of a system for velocity determination of a wireless transmitter.

FIG. 4 shows a schematic diagram of a system 400 for velocity determination of a wireless transmitter 401. The system 400 comprises a wireless transmitter 401, first wireless receiver 403, a second wireless receiver 405, a third wireless receiver 407, an $i^{th}$ wireless receiver 409, an $n^{th}$ wireless receiver 411, a velocity vector v 413, and a server 415. The wireless transmitter 401 can comprise an antenna.

The wireless transmitter 401 or mobile transmitter and several wireless receivers 403, 405, 407, 409, 411 can be located at fixed positions. The small arrows can indicate projections of the velocity vector v 311, shown as a large arrow, onto the line of sight (LOS) lines or vectors.

The wireless transmitter 401 or mobile transmitter can transmit radio signals to be received by several wireless receivers 403, 405, 407, 409, 411 or receivers $R_i$, i=1, ..., n, total number of receivers can be n.

The local clocks of the wireless receivers 403, 405, 407, 409, 411 can be supposed to be synchronized. Each carrier wave signal received by the wireless receivers 403, 405, 407, 409, 411 can be tracked by its own PLL. Each PLL can generate the carrier phase measurement $\phi_i^{(k)}$ where k can be the number of sequential time moments, k=1, 2, .... The carrier phases can then be sent to the processing server 415.

The system 400 for velocity determination of a wireless transmitter 401 in FIG. 4 can be interpreted as an inverse system to the system 300 for velocity determination of a wireless receiver 100 in FIG. 3. The velocity vector v 413 of the wireless transmitter 401 can be determined analogously as the velocity vector v 311 of the wireless receiver 100 by exchanging wireless transmitters by wireless receivers and vice versa.

The system 400 therefore supposes an operational mode inverse to the system 300.

Figure 5:
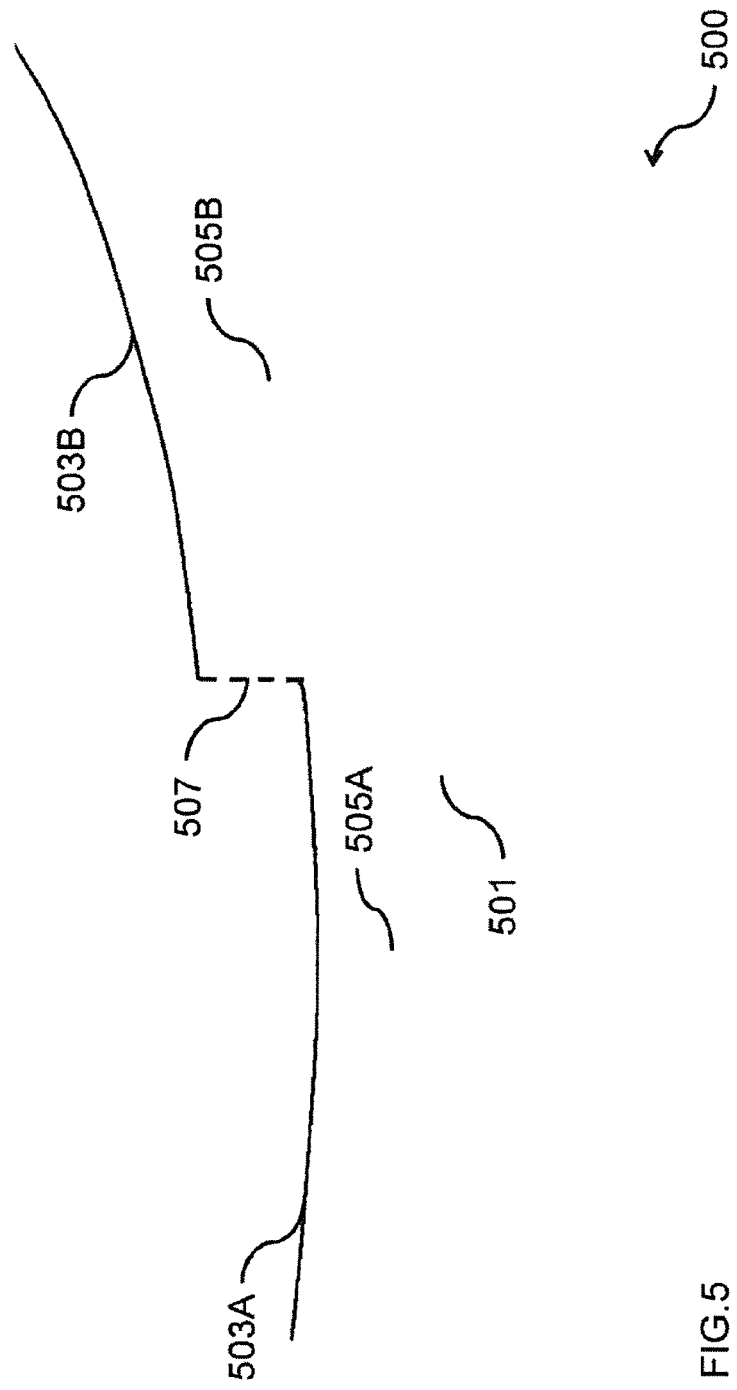
FIG. 5 shows a schematic diagram of distances versus time between a wireless receiver and a wireless transmitter.

FIG. 5 shows a schematic diagram 500 of distances versus time between a wireless receiver and a wireless transmitter. The diagram 500 comprises a graph 501 indicating a precise distance between the wireless receiver and the wireless transmitter, a graph 503A indicating a first carrier phase measurement distance between the wireless receiver and the wireless transmitter, a graph 503B indicating a second carrier phase measurement distance between the wireless receiver and the wireless transmitter, a first distance deviation 505A between the precise distance and the first carrier phase measurement distance, a second distance deviation 505B between the precise distance and the second carrier phase measurement distance, and a distance difference 507 between the first carrier phase measurement distance and the second carrier phase measurement distance.

The first distance deviation 505A between the precise distance and the first carrier phase measurement distance can relate to a carrier phase ambiguity. The second distance deviation 505B between the precise distance and the second carrier phase measurement distance can relate to a changed carrier phase ambiguity. The distance difference 507 between the first carrier phase measurement distance and the second carrier phase measurement distance can relate to an occurrence of a cycle slip of a phase locked loop.

Carrier phase measurements can be affected by jumps. The graph 501 can denote an ideal carrier phase depending on a position of an object and/or a variation of a clock shift. The graphs 503A, 503B can illustrate measured carrier phases affected by one cycle slip.

The graphs 501, 503A, 503B can illustrate a time dependency of a carrier phase ambiguity in time. They can indicate that a PLL tracking carrier phase got disturbed and after settling, i.e. an end of a transient process, the PLL got settled at different stable point. This phenomenon can be called a cycle slip (CS). A disturbance of the PLL operation can be caused by short term shading due to bodies passing by the receiver antenna, mechanical shock affecting a local crystal oscillator, or other natural reasons.

The presence of a CS, taking arbitrary integer values, can make it difficult to apply the measurements equation (M) for determination of a velocity vector as the equation (M) can be derived under assumption of an absence of CSs.

A correct detection and compensation or isolation of CSs can be very important. It is desirable to detect CSs with high probability, like 0.999. This leads to a high sensitivity of the CS detector (CSD). Making the CSD too sensitive, fault alarms can occur. The CSD can detect CSs with very high probability producing a large number of fault alarms. Fault alarms can be not so undesirable as lost CSs, but also not desirable, as they can disturb a smooth behavior of the system. Therefore, a reliable CSD can be desirable, while not producing large number of fault alarms.

High precision global navigation satellite system (GNSS) receivers can operate in accordance to this operation scheme. Transmitters can be mounted e.g. at the navigation satellites of the global positioning system GPS, the global navigation satellite system GLONASS, and/or the global navigation satellite system Galileo.

Precise navigation can be based on simultaneous tracking and processing of code-phase, carrier-phase, and/or Doppler frequency observables measured for a plurality of satellites, allowing for precise positioning and velocity determination.

An challenging issue for precise positioning can be a correct and reliable carrier phases integer ambiguity resolution. Lost cycle slips can prevent from a desired operation of estimating filters. Therefore, cycle slips detection, isolation and/or correction can be considered as an important challenge of maintaining an operational integrity.

Figure 6:
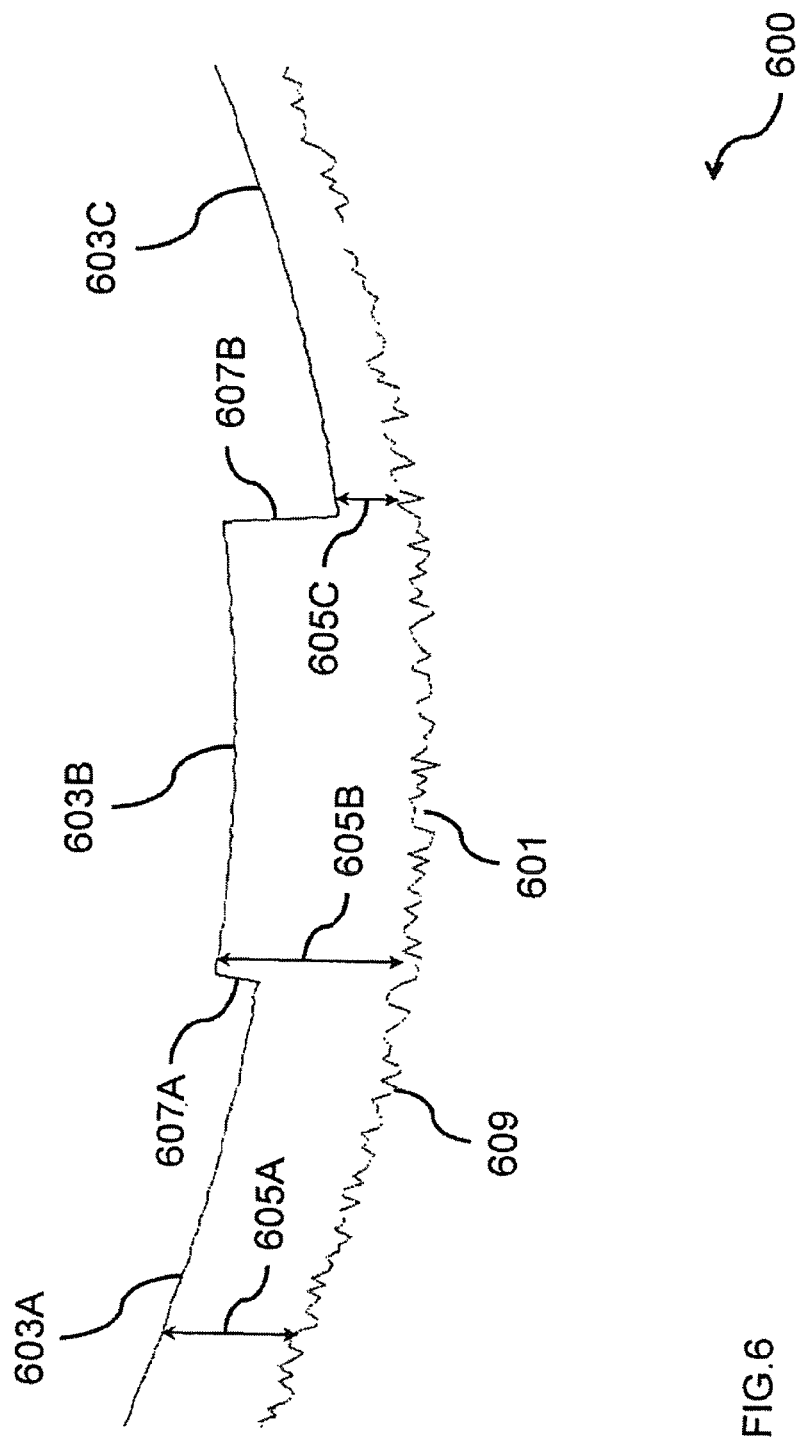
FIG. 6 shows a schematic diagram of distances versus time between a wireless receiver and a wireless transmitter.

FIG. 6 shows a schematic diagram 600 of distances versus time between a wireless receiver and a wireless transmitter. The diagram 600 comprises a graph 601 indicating a precise distance between the wireless receiver and the wireless transmitter, a graph 603A indicating a first carrier phase measurement distance between the wireless receiver and the wireless transmitter, a graph 603B indicating a second carrier phase measurement distance between the wireless receiver and the wireless transmitter, a graph 603C indicating a third carrier phase measurement distance between the wireless receiver and the wireless transmitter, a first distance deviation 605A between the precise distance and the first carrier phase measurement distance, a second distance deviation 605B between the precise distance and the second carrier phase measurement distance, a third distance deviation 605C between the precise distance and the third carrier phase measurement distance, a first distance difference 607A between the first carrier phase measurement distance and the second carrier phase measurement distance, and a second distance difference 607B between the second carrier phase measurement distance and the third carrier phase measurement distance. The diagram 600 further comprises a graph 609 indicating a noisy pseudo-range measurement distance.

The first distance deviation 605A between the precise distance and the first carrier phase measurement distance can relate to a carrier phase ambiguity. The second distance deviation 605B between the precise distance and the second carrier phase measurement distance can relate to a changed carrier phase ambiguity. The third distance deviation 605C between the precise distance and the third carrier phase measurement distance can relate to a further changed carrier phase ambiguity.

The first distance difference 607A between the first carrier phase measurement distance and the second carrier phase measurement distance can relate to an occurrence of a cycle slip of a phase locked loop. The second distance difference 607B between the second carrier phase measurement distance and the third carrier phase measurement distance can relate to a further occurrence of a cycle slip of a phase locked loop.

Figure 7:
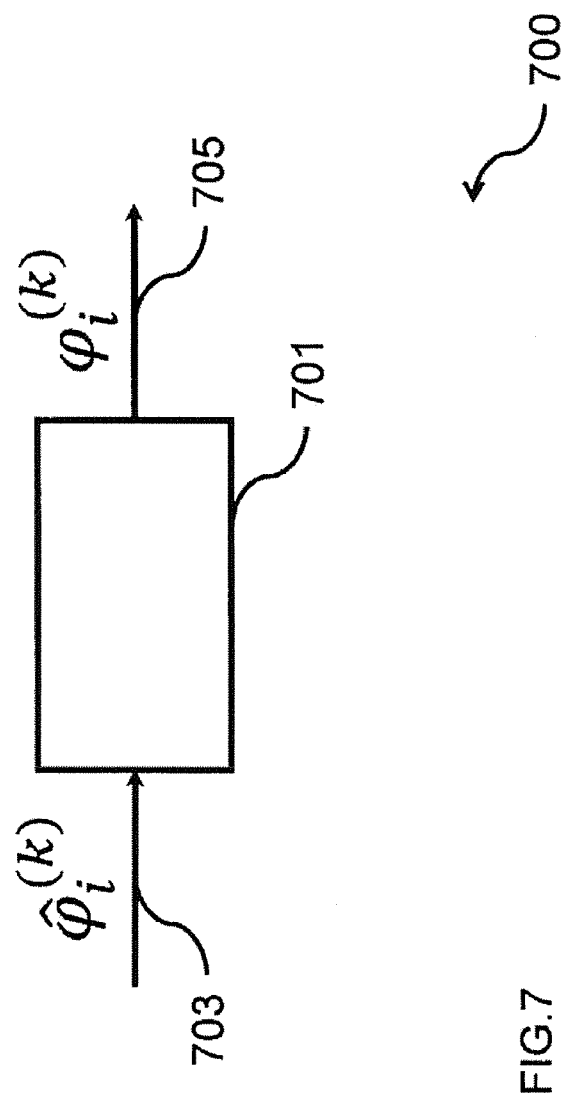
FIG. 7 shows a schematic diagram of a carrier phase processing by a filter.

FIG. 7 shows a schematic diagram 700 of a carrier phase processing by a filter 701. The diagram 700 comprises the filter 701, an input phase 703, and an output phase 705.

The input phase 703 can relate to a measured carrier phase $\hat{\phi}_i^{(k)}$. The output phase 705 can relate to a filtered carrier phase $\phi_i^{(k)}$.

The carrier phase measurement can pass through the smoothing filter 701. Each filter 701 in a bank can serve for each wireless transmitter separately.

In an implementation form, each carrier phase measurement of the $i^{th}$ transmitter $\hat{\phi}_i^{(k)}$ can be directed from a PLL to the smoothing and/or predicting filter 701, e.g. a Kalman filter, as shown in FIG. 7.

The carrier phase $\phi_i^{(k)}$ taken from the filter 701 can be smoothed according to the dynamic model of the filter 701.

It can e.g. be assumed, that the filter 701 is of third order. Then the state space of each filter 701 can be three dimensional, comprising three dimensional vectors $$\Phi_i^{(k)} = \begin{pmatrix} \varphi_i^{(k)} \\ \dot{\varphi}_i^{(k)} \\ \ddot{\varphi}_i^{(k)} \end{pmatrix}.$$

The filter 701 can sequentially calculate an extrapolated and/or predicted state $\overline{\Phi}_i^{(k+1)} = F\overline{\Phi}_i^{(k)}$ and a corrected state
$\Phi_i^{(k+1)} = \overline{\Phi}_i^{(k+1)} + K(\hat{\phi}_i^{(k+1)} - \overline{\phi}_i^{(k+1)})$.

The transition matrix F can be constructed according to the dynamic model laid in the basis of the filter 701. One of frequently used models can have the matrix $$F = \begin{bmatrix} 1 & \tau & 1/2\tau^2 \\ 0 & 1 & \tau \\ 0 & 0 & 1 \end{bmatrix},$$

where $\tau$ can be the time step. The gain coefficient vector K can be constructed either as a limit of a sequence of iteratively re-calculated Kalman filter gains, or adjusted adaptively during tuning. The residual $\epsilon_i^{(k+1)} = (\hat{\phi}_i^{(k+1)} - \overline{\phi}_i^{(k+1)})$ can mean a disagreement between a predicted carrier phase $\overline{\phi}_i^{(k+1)}$ and raw carrier phase taken from the PLL $\hat{\phi}_i^{(k+1)}$. The residual can be compared against a threshold $|\epsilon_i^{(k+1)}| < T$ (CT) Satisfied inequality (CT) can be considered as normal steady state operation, which can mean that the object is either static, or it is steadily moving allowing the PLLs continuously track a variation of carrier phases. A violated inequality can be considered as an indication or sign of a cycle slip.

In another implementation form, each PLL can be considered as a filter performing prediction and/or correction operations. The value of the error signal can be analyzed before the feedback is locked. The PLL can raise an alarm flag if the error signal exceeds some threshold indicating possibility of a cycle slip.

A disadvantage of this approach, considering each measurement channel independently, can be that its performance can be highly dependent on the agreement between the expected normal motion of the object and dynamic model of the filter 701. In other words, that can be pretty hard to identify whether the fast variation of the carrier phase, e.g. indicated as a disagreement between expected and received carrier phase, is caused by a fast and/or aggressive motion of the object, or by a cycle slip.

A fast variation of the carrier phase caused by the movement of the object can lead to a fast variation of all carrier phase measurements, so an alternative approach can be based on simultaneous multichannel analysis of the carrier phase incremental, checking whether they all change in agreement and their variation is consistent with a changing of the object's position. In order to perform this check, the number of measurements can be greater than 4. In other words, the linear system (M) can be over-determined.

So, alternatively to the independent channel analysis described above, the set of measurements (M) can be considered. A least square solution can be calculated $Y^k = (H^T W H)^{-1} H^T W \delta \phi^k$, with $W = C^{-1}$, C can be the errors covariance matrix. Then residuals can be calculated $r^k = \delta \phi^k - (H^T W H)^{-1} H^T W \delta \phi^k$, and squared with the weighting matrix W, forming the value $\chi_{est}^2 = r^{kT} W r^k$.

An absence of cycle slips can mean that only noise is presented in the errors vector. In this case, an estimated $\chi_{est}^2$ value can satisfy the $\chi^2$ statistics distribution with a number of degrees freedom equal to ndf=n−4. A comparison with the $\chi^2$ statistical threshold $\chi_{est}^2 < T_{\chi^2}(\alpha, ndf)$, (NoCS) corresponding to a certain confidential probability $\alpha$ and a number of degrees ndf, as there are n observables and 4 parameters to be estimated, can be performed to check whether an assumption about an absence of cycle slips is justified. Typical value of $\alpha$ can be 0.95-0.999.

Otherwise, if the (NoCS) inequality does not hold, the hypothesis of no slips can have a probability of less than 1−$\alpha$ and the statement that cycle slips are presented can be assumed to be proved.

After a presence of CSs is proved, i.e. the detection gave positive answer, an alarm flag can be raised and an isolation procedure can start. The isolation procedure can be aimed to find which PLL, or PLLs, produces carrier phase measurement affected by cycle slips at time instant k+1. In other words, the isolation procedure can try to answer the question for which i the condition $d_i^k \neq 0$, or equivalently for which PLL $N_i^{k+1} \neq N_i^k$ holds.

There can be at least two ways to perform an isolation procedure having results of a least squares minimization.

A first isolation procedure (A) can be based on an assumption that channel corresponding the maximum value of the residual entry is $$i^* = \underset{i}{\arg\max} |r_i^{(k)}|. \quad \text{(Max)}$$

The channel i* can then be excluded from the system (M). A new system (M) can be considered having dimensions n'×4, where n'=n−1 and LMS calculations repeat ending again with checking the inequality (NoCS) with new ndf'=ndf−1. If the inequality (NoCS) is satisfied, then a single CS can be found and isolated correctly. Otherwise, either the assumption that CS produces maximum residual entry can be invalid, or there may be no unique CS. The procedure can repeat until either the condition (NoCS) is satisfied, or a new ndf'=0 and no redundancy is left for analysis.

In the first case, all cycle slips, probably excluding excessive number of channels which have not been actually affected, can have been found with high probability. In the second case, the procedure can have ended without results. Channels affected by cycle slips may not have been identified and an operation of the whole system can be subject to reset with an alarm flag.

A second isolation procedure (B) can run an exhaustive search among channel indices, excluding them one by one, then, if necessary, combinations of various pairs of indices, then, if necessary, triples and so on. The procedure can stop if for remaining channels with reduced number n'<n, the (NoCS) condition holds (with n substituted by n'). To re-calculate the least square solutions, a previous solution can be modified applying low rank modifications.

The isolation procedure can stop also if there is no more redundancy to check residuals, which can be zero if n'=4. In this case the system can be subject to reset and the alarm flag can be raised. Velocity may not be determined reliably in this case.

An advantage of isolation procedure A can be the simplicity and low computational cost. A disadvantage of the isolation procedure A can be the low accuracy when detecting an affected channel. An advantage of the isolation procedure B can be the good accuracy of isolation of the affected channel or channels comparing with procedure A. A disadvantage of the isolation procedure B can be the high computational cost which can be caused by an exhaustive search involved in the calculations.

A CS isolation procedure combining high accuracy, i.e. probability of correct CS detection, and relatively low computational cost is desirable.

An isolation procedure based on a compressive sensing approach can aim to improve the accuracy and reduce the computational cost of isolation procedures.

If redundancy is high enough, like 16-20, and number of cycle slips is low, like 1-2, then not only isolation, but also correction of CSs can be expected.

High precision Global Navigation Satellite Systems (GNSS) receivers can use range measurements generated in the two scales of code phase and carrier phase.

Code phase, or pseudo-range, measurements can be connected with the geometric distance from a GNSS antenna to the satellites by the following relationship:

$$\rho_{sr}(t) = \sqrt{(x_s(t) - x_r(t))^2 + (y_s(t) - y_r(t))^2 + (z_s(t) - z_r(t))^2} + c(\Delta_s(t) - \Delta_r(t)) + \varepsilon_{sr}(t)$$

$\rho_{sr}$ can be the pseudo-range measured by the receiver r for the satellite s which can be a GPS or a GLONASS satellite or can belong to another satellite system. In other words, it can be a pseudo-range between the satellite and the receiver. The prefix pseudo can mean that the range can be affected by clock errors.

$\Delta_s$ can be a clock difference between the local oscillator of the satellite and the system time standard. $\Delta_r$ can be a clock difference between the local oscillator of the receiver and the system time standard. $x_s, y_s, z_s$ can be the satellite's position in the earth centered earth fixed (ECEF) Cartesian frame. $x_r, y_r, z_r$ can be the receiver's position in ECEF, which can be determined as a result of a navigation task. $\epsilon_{sr}$ can be a measurement error. c=299792458 m/sec can be the light speed in the vacuum. (t) can be the symbol denoting dependency on time. Time can be supposed to be discrete.

The error $\epsilon_{sr}(t)$ can include a white noise component, an atmospheric component, a multipath component and other errors. The noise component can belong to the range 1-10 meters. This can explain why simple non-professional navigators using only pseudo-ranges can be accurate up to several meters.

Another measurements scale can be the carrier phase. A measurement equation connecting the carrier phase with the receiver's position can be:

$$\phi_{sr}(t) = \frac{1}{\lambda_s}\sqrt{(x_s(t) - x_r(t))^2 + (y_s(t) - y_r(t))^2 + (z_s(t) - z_r(t))^2} + f_s(\Delta_s(t) - \Delta_r(t)) + N_s + \xi_{sr}(t)$$

$\phi_{sr}$ can be the carrier phase measurement. $\lambda_s$ and $f_s$ can be wavelength and carrier frequency respectively, $$\lambda_s = \frac{c}{f_s}.$$

Assuming that the receiver can operate on the first frequency band L1, $f_s$=1575.42 MHz for all GPS satellites and $f_s$=1602+k×0.5625 MHz for GLONASS satellites can be obtained, where k can be the so called letter number connected to the GLONASS satellite index number. Different satellites can have different letters because GLONASS can exploit FDMA to distinguish between satellites.

$N_s$ can be the carrier phase ambiguity which can be an unknown integer value. $\xi_{sr}$ can be the carrier phase measurement error.

The error $\xi_{sr}(t)$ can include a white noise component, an atmospheric component, a multipath component and other errors. As opposite to the pseudo-range noise, the carrier phase noise component can belong to the range 0.001-0.01 meters. Using carrier phase measurements can give the key for high precision navigation provided by professional geodetic grade GNSS receivers.

The main obstacle to straightforward using of carrier phase measurements to get centimeter accuracy of positioning can be the presence of carrier phase ambiguity $N_s$. Its nature can be in a difference between initial phases of a heterodyne of the receiver and a generator of the satellite. Moreover, the PLL's tracking carrier phase can be accurate up to an unknown number of cycles. This can explain why ambiguity can take an integer value.

The dependency on time of the distance to the satellite and code- and carrier phase measurements after compensation for time scale differences can be illustrated by FIG. 6.

The horizontal axis can indicate time. The vertical axis can indicate distance. The precise distance to the satellite can be shown by graph 601. The graph 609 can show pseudo-range measurements affected by noise. Carrier phase measurements can be shown by graphs 603A, 603B, 603C. The shift between graphs 603A, 603B, 603C and graph 609 can be due to the carrier phase ambiguity.

There are two jumps in carrier phase measurements plot in graphs 603A, 603B, 603C. These can illustrate a time dependency of the carrier phase ambiguity in time. They can indicate that the PLL tracking carrier phase got disturbed and after settling, i.e. an end of a transient process, the PLL got settled at a different stable point. This phenomenon can be called a cycle slip (CS). The presence of a CS, taking arbitrary integer values, can make it difficult to filter and estimate the carrier phase ambiguity. Lost CSs can violate a smooth behavior of a precise navigation engine.

A correct detection, compensation, and/or isolation of CSs can be a challenge. It can be desirable to detect CSs with high probability, e.g. 0.999. This can dictate a high sensitivity of a CS detector (CSD). Making CSD too sensitive, a possibility of fault alarms is allowed. CSD can detect CSs with very high probability producing quite a large number of fault alarms. Fault alarms may not be so undesirable as lost CSs, but can also be not desirable, as they can disturb a smooth behavior of an ambiguity estimator. In short words, a reliable CSD can be desirable, yet not producing a large number of fault alarms.

Let n be the number of satellites tracked by the receiver. Let $X(t)=(x_r(t), y_r(t), z_r(t))^T$ be the solution obtained by the navigator at time instance t.

Let H be the matrix of linearized, in the neighborhood of the point $X(t)$, system of carrier phase measurements, called also a directional cosine matrix. It can vary very slowly in time and it can be considered as almost constant. So, the dependency on time can be omitted, $$H = \begin{bmatrix} h_{1x} & h_{1y} & h_{1z} & 1 \\ h_{2x} & h_{2y} & h_{2z} & 1 \\ \cdots & \cdots & \cdots & \cdots \\ h_{nx} & h_{ny} & h_{nz} & 1 \end{bmatrix}$$

with $(h_{sx}, h_{sy}, h_{sz})^T$ being the directional cosines vector, or the vector of the line of sight (LOS) from the receiver to the satellite. The fourth column of the matrix can be composed of units as the variables to be determined can be $x_r, y_r, z_r, c\Delta_r$, i.e. three Cartesian components of the position and time shift of the receiver local oscillator expressed in meters.

Let $\Lambda=\mathrm{diag}(\lambda_1, \lambda_2, \ldots, \lambda_n)$ be the diagonal matrix of carrier wavelengths. Let D be the time difference operator $D\phi(t)=\phi(t+1)-\phi(t)$.

The system of linearized equations of carrier phase measurements with respect to the position $X(t+1)$ can take the form $\Lambda D\phi(t)-R(t)\equiv Y(t)=HDX(t)+DN(t)+D\xi(t)$ (LinEq)

$$R_s(t) = \sqrt{(x_s(t)-x_r(t))^2 + (y_s(t)-y_r(t))^2 + (z_s(t)-z_r(t))^2}$$

If cycle slips are absent, then $DN(t)\equiv 0$ (No CS)

A possible approach to CSD can be like follows. Assuming no CSs $DN(t)\equiv 0$ try to solve the over-determined system with weights W $Y(t)=HDX(t)$ (LinEq-NoCS) having the result $DX(t)=(H^TWH)^{-1}H^TWY(t)$ Then check residuals $r\equiv Y(t)-HDX(t)=(I-H(H^TWH)^{-1}H^TW)Y(t)$, calculate weighted sum of squares $\chi^2=r^TWr=Y(t)^T(W-WH(H^TWH)^{-1}H^TW)Y$ (t), and compare with the $\chi^2$ statistics threshold $T_{\chi^2}(\alpha,\mathrm{ndf})$ corresponding to a certain confidence probability $\alpha$ and a number of degrees of freedom (ndf) which is n−4, as there are n equations and 4 variables. Typical value of $\alpha=0.954\div 0.999$.

An assumption about no cycle slips can be approved if the following condition holds: $\chi^2 < T_{\chi^2}(\epsilon, n-4)$ (NoCS-approved) Otherwise, if this inequality does not hold, the hypothesis of no slips can have a probability of less than 1−$\alpha$. After presence of CSs is proved, i.e. detection gave a positive answer, the alarm flag can be raised and isolation procedure can start.

The isolation procedure can be aimed to find which satellite, or satellites, has a carrier phase measurement affected by a cycle slips at the time instant t+1. In other words, the isolation procedure can try to answer the question which $DN_s(t)\ne 0$, or equivalently for which satellite $N_s(t)\ne N_s(t+1)$ Usually, an isolation procedure can run an exhaustive search among satellites indices, excluding them one by one, then, if necessary, combinations of various pairs of indices, then, if necessary, triples and so on. The procedure can stop if for remaining satellites, reduced number n'<n, the (NoCS-approved) condition holds with n substituted by n'. To re-calculate (LinEq-NoCS) equations it is desirable to modify a previous solution applying a low rank modifications.

The isolation procedure can stop also if there is no more redundancy to check residuals, which will be zero if n'=4. In this case the system can be subject to reset and all residuals estimators can start to filter from the scratch.

If the redundancy is high enough, like 16-20, and the number of cycle slips is low, like 1-2, then not only isolation can be expected, but also correction of CSs.

In the following, a first difference of measurements of two receivers, a rover and a base can first be calculated. It can be possible that in the first difference common errors like ephemeris errors and satellites clock errors $\Delta_s(t)$ can vanish.

In the following, the system (LinEq) can be considered. Considering DN(t) as an error affecting only a few of the linear equations, a linear programming decoding procedure can be applied. In this case it can look like $$Y(t) - HDX(t) + DN(t) = 0, \quad (L1)$$
$$|DN(t)|_1 \to \min_{DX(t)\in R^4, DN(t)\in R^n}$$

or, restricting DN(t) to only integer values $DN(t)\in Z^n$ where $Z^n$ can be an integer lattice $$Y(t) - HDX(t) + DN(t) = 0, \quad (\mathrm{L1\ SI})$$
$$|DN(t)|_1 \to \min_{DX(t)\in R^4, DN(t)\in Z^n}$$

The real-valued L1 optimization problem (L1) can be solved by linear programming procedures, like a simplex method, and/or an interior point method.

Restricting DN(t) to only integer values, a semi-integer linear program (L1-SI) can be obtained.

Alternatively, an orthogonal matching pursuit (OMP) approach can be applied, which can be less accurate in detection of sparse solutions, but can be much faster than LP and so can better run in real time. For the sake of brevity, it can be defined x=DX(t), d=−DN(t), b=−Y(t) and (L1) can be rewritten as $$Hx + d = b, \quad (L1')$$
$$|d|_1 \to \min_{x \in R^4, d \in R^n}$$

Applying a QR factorization to the matrix H, $$QH = \begin{bmatrix} L^T \\ O \end{bmatrix}$$

can be obtained where L can be a low triangle 4×4 matrix, O can be a (n−4)×4 zero matrix, Q can be an n×n orthogonal matrix, e.g. a householder matrix. Then, presenting the last matrix in a block form $$Q = \begin{bmatrix} Z \\ F \end{bmatrix},$$
$$Z \in R^{4 \times n},$$

$F \in R^{(n-4) \times n}$ the following identity can be obtained FH=0 (Annihilator)

The last identity can mean that F can be an annihilating matrix for H. Multiplying both sides of the linear system (L1') by the matrix F and applying a scheme, the problem to find the sparsest solution of the linear system can be obtained:
Fd=y (Residual) where y=Fb. The sparse solution of the (Residual) can be obtained by applying an OMP algorithm. In addition to an ordinary OMP scheme, the last iteration of OMP can be concluded with integer valued least square detectors, such as ZF, MMSE, MLD, or spherical, in order to have integer values of d, and so DN(t).

In an implementation form, the patent application relates to a compressive sensing based method for cycle slips detection and correction in PLLs used in velocity determination systems.

In an implementation form, the patent application relates to the behavior of the PLL used in velocity determination systems, especially the anomalous phase variation detection.

In an implementation form, the patent application relates to a compressive sensing based method for cycle slips detection and correction in GNSS receivers.

In an implementation form, the patent application is based on using the concepts of sparsity of a cycle slips vector and linear programming decoding, as cycle slips can occur seldom and can affect only a few carrier phase measurements among a plurality of measurements.

In an implementation form, the patent application can be applied to data integrity maintaining in motion detection systems. It can also be applied to data integrity maintaining in satellite navigation receivers.

In an implementation form, the patent application relates to a method for cycle slips detection and correction based search for a most sparse error vector.

In an implementation form, a linear programming approach is used.

In an implementation form, a semi-integer linear programming is used.

In an implementation form, an OMP enhanced by integer search at its last step is used.

In an implementation form, the patent application is based on exploiting a linear programming approach to solve a cycle clips detection problem.

In an implementation form, the patent application is based on exploiting a semi-integer linear programming approach for detection and/or correction of cycle slips.

In an implementation form, the patent application is based on exploiting an OMP algorithm for cycle slips detection and/or correction.

In an implementation form, the patent application is based on exploiting an OMP algorithm enhanced by an integer search at its last iteration for cycle slips detection and/or correction.

What is claimed is:

1. A wireless receiver capable of determining its velocity with respect to a plurality of wireless transmitters, the wireless receiver comprising:
   a communication interface configured to receive a plurality of carrier signals originating from the plurality of wireless transmitters; and
   a processor configured to:
      determine a plurality of carrier phases of the carrier signals at two different time instants,
      determine a plurality of carrier phase differences from the determined plurality of carrier phases for each carrier signal between the two different time instants,
      determine a location matrix indicating a geometric relationship between a location of the wireless receiver and locations of the plurality of wireless transmitters, and
      determine the velocity of the wireless receiver based on an optimization procedure that includes the following equation:

$$\delta \varphi^k - H Y^k + d^{(k)} = 0$$

where $\delta\varphi^k$ denotes a vector comprising the plurality of carrier phase differences, H denotes the location matrix, $Y^k$ denotes a vector comprising the velocity of the wireless receiver, $d^{(k)}$ denotes a vector comprising a number of cycle slip values, and k denotes a time instant index.

2. The wireless receiver according to claim 1, wherein the optimization procedure further includes the following equation:

$$|d^{(k)}|_1 \to \min_{Y^k \in R^4, d^k \in R^n}$$

wherein $|\ |_1$ denotes the $l_1$-norm of a vector, $R^4$ denotes the 4-dimensional set of real numbers, $R^n$ denotes the n-dimensional set of real numbers and n denotes the number of wireless transmitters.

3. The wireless receiver according to claim 1, wherein the optimization procedure further includes the following equation:

$$|d^{(k)}|_1 \to \min_{Y^k \in R^4, d^k \in Z^n}$$

wherein $| \ |_1$ denotes the $l_1$-norm of a vector, $R^4$ denotes the 4-dimensional set of real numbers, $Z^n$ denotes the n-dimensional integer lattice and n denotes the number of wireless transmitters.

4. The wireless receiver according to claim 1, wherein the optimization procedure further includes the following equation:

$$|d^{(k)}|_p \to \min_{Y^k \in R^4, d^k \in R^n}$$

wherein $| \ |_p$ denotes the $l_p$-norm of a vector, $R^4$ denotes the 4-dimensional set of real numbers, $R^n$ denotes the n-dimensional set of real numbers and n denotes the number of wireless transmitters.

5. The wireless receiver according to claim 1, wherein the processor is configured to perform the optimization procedure using a linear programming method, a semi-integer linear programming method or an orthogonal matching pursuit method.

6. The wireless receiver according to claim 1, wherein the processor is configured to determine the plurality of carrier phases of the carrier signals by comparing the plurality of carrier signals with a plurality of reference signals.

7. The wireless receiver according to claim 1, wherein the communication interface comprises a plurality of phase-locked-loops configured to receive the plurality of carrier signals originating from the plurality of wireless transmitters.

8. The wireless receiver according to claim 1, wherein the communication interface is configured to receive the plurality of carrier signals according to a frequency-division-multiple-access scheme, time-division-multiple-access scheme or a code-division-multiple-access scheme.

9. The wireless receiver according to claim 1, wherein the communication interface is configured to selectively receive a plurality of carrier signals having different carrier frequencies, carrier phase differences, or carrier phase Doppler frequencies.

10. A method for determining a velocity of a wireless receiver with respect to a plurality of wireless transmitters, the method comprising:
receiving a plurality of carrier signals originating from the plurality of wireless transmitters by the wireless receiver;
determining a plurality of carrier phases of the carrier signals at two different time instants by the wireless receiver;
determining a plurality of carrier phase differences from the determined plurality of carrier phases for each carrier signal between the two different time instants by the wireless receiver;
determining a location matrix indicating a geometric relationship between a location of the wireless receiver and locations of the plurality of wireless transmitters; and
determining the velocity of the wireless receiver based on an optimization procedure that includes the following equation:

$$\delta\varphi^k - HY^k + d^{(k)} = 0$$

where $\delta\varphi^k$ denotes a vector comprising the plurality of carrier phase differences, H denotes the location matrix, $Y^k$ denotes a vector comprising the velocity of the wireless receiver, $d^{(k)}$ denotes a vector comprising a number of cycle slip values, and k denotes a time instant index.

11. The method according to claim 10, wherein the optimization procedure further includes the following equation:

$$|d^{(k)}|_1 \to \min_{Y^k \in R^4, d^k \in R^n}$$

wherein $| \ |_1$ denotes the $l_1$-norm of a vector, $R^4$ denotes the 4-dimensional set of real numbers, $R^n$ denotes the n-dimensional set of real numbers and n denotes the number of wireless transmitters.

12. The method according to claim 10, wherein the optimization procedure further includes the following equation:

$$|d^{(k)}|_1 \to \min_{Y^k \in R^4, d^k \in Z^n}$$

wherein $| \ |_1$ denotes the $l_1$-norm of a vector, $R^4$ denotes the 4-dimensional set of real numbers, $Z^n$ denotes the n-dimensional integer lattice and n denotes the number of wireless transmitters.

13. The method according to claim 10, wherein the optimization procedure further includes the following equation:

$$|d^{(k)}|_p \to \min_{Y^k \in R^4, d^k \in R^n}$$

wherein $| \ |_p$ denotes the $l_p$-norm of a vector, denotes the 4-dimensional set of real numbers, $R^n$ denotes the n-dimensional set of real numbers and n denotes the number of wireless transmitters.

14. The method according to claim 11, wherein the optimization procedure is performed using a linear programming method, a semi-integer linear programming method or an orthogonal matching pursuit method.

15. A non-transitory computer readable medium containing instructions for performing the method according to claim 10 when executed by at least one processing device.

16. The method according to claim 10, wherein the optimization procedure is performed using a linear programming method, a semi-integer linear programming method or an orthogonal matching pursuit method.

17. The method according to claim 10, wherein the plurality of carrier phases of the carrier signals are determined by comparing the plurality of carrier signals with a plurality of reference signals.

18. The wireless receiver according to claim 2, wherein the communication interface comprises a plurality of phase-locked-loops configured to receive the plurality of carrier signals originating from the plurality of wireless transmitters.

* * * * *